Jan. 5, 1954 W. H. ELLIOT 2,665,404
UNBALANCED PRIMARY MOTOR CONTROL SYSTEM
Filed Dec. 18, 1950 2 Sheets-Sheet 1

Inventor
William H. Elliot
By W. E. Hyde
Attorney

Jan. 5, 1954
W. H. ELLIOT
2,665,404
UNBALANCED PRIMARY MOTOR CONTROL SYSTEM
Filed Dec. 18, 1950
2 Sheets-Sheet 2
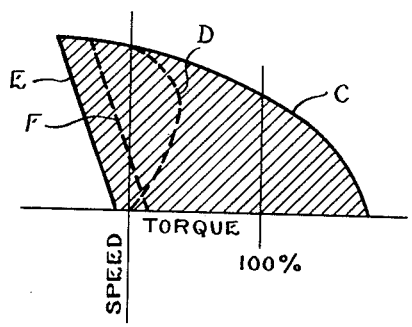
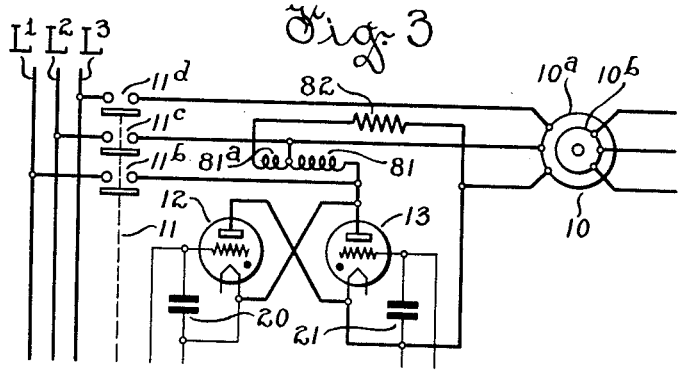
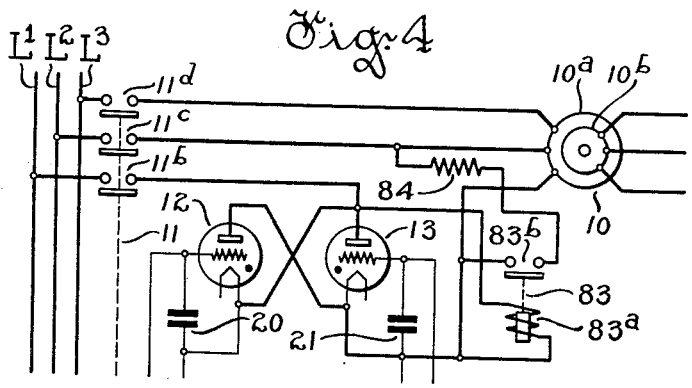
Inventor
William H. Elliot
By A. E. ——
Attorney Patented Jan. 5, 1954

2,665,404

UNITED STATES PATENT OFFICE 2,665,404

UNBALANCED PRIMARY MOTOR CONTROL SYSTEM

William H. Elliot, Whitefish Bay, Wis., assignor to Cutler-Hammer, Inc., Milwaukee, Wis., a corporation of Delaware Application December 18, 1950, Serial No. 201,454

11 Claims. (Cl. 318—227)

This invention relates generally to unbalanced primary control systems for induction motors and more particularly to improvements in such systems whereby the motor speed is controllable over a much wider range.

In my Patent No. 2,448,256, granted August 31, 1948, and in Patent No. 2,460,037, to Edwin W. Seeger, granted January 25, 1949, there are disclosed systems for controlling the speed of wound rotor type induction motors by controlling the effective impedance of a gaseous conduction path inserted in one phase connection to the primary circuit of the motor. By determining the moment of conduction during the half-cycles of supplied alternating voltage, the effective current to the motor is controlled and with it the effective torque so that the motor may be operated with a given load over a relatively wide range of speeds or may be made to hold a preset speed with widely varying loads.

The above systems, however, have a limitation which arises when the motors controlled by them are called upon to handle light loads. This is occasioned by the fact that the least torque the respective systems can supply is the single-phase torque. Consequently, if it happens that, at a given speed, the load in question requires less torque than is provided by the single-phase torque, the motor will accelerate along the single-phase speed torque curve to a stable point on this curve, which point may be at a speed considerably higher than desired. In other words, control is lost. Whether or not the above conditions will arise and the frequency with which they will arise depends upon the application to which the motor controlled is put. The problem is particularly acute in machine tool applications where no load or very light load conditions might be experienced intermixed with full load operation. In such case, if the motor speed should exceed the preset speed, the controller, in an effort to retard the motor, causes the tubes to cease conducting, thereby leaving the motor with single-phase power. If the motor is operating a light load at medium or high speeds, and particularly if there is a low amount of resistance in the secondary of the wound rotor motor or a high-torque squirrel-cage motor is being used, the motor may continue to operate at high speed on single-phase rather than decelerate to the preset speed.

Accordingly, it is an object of this invention to provide an impedance controlled unbalanced primary control system which makes it possible to maintain speed control of even an unloaded induction motor from zero speed to substantially synchronous speed.

A further object of the invention is to provide an improved unbalanced primary motor control system for induction motors which maintains control of light or very light loads over a much greater range than provided by prior systems.

Another object is to improve motor control systems of the type above-described in order to provide braking torque for an induction motor which normally operates in the motoring quadrant.

A further object is to improve such control systems in order to provide braking torque for an induction motor only when needed for decelerating or speed controlling purposes.

Other objects and advantages will hereinafter appear.

In the drawings,

Fig. 2 is a diagram showing certain characteristic curves.

Fig. 3 illustrates a modification of the system shown in Fig. 1, and

Fig. 4 illustrates a modification which may be made in either of the circuits shown in Figs. 1 and 3.

Figure 1:
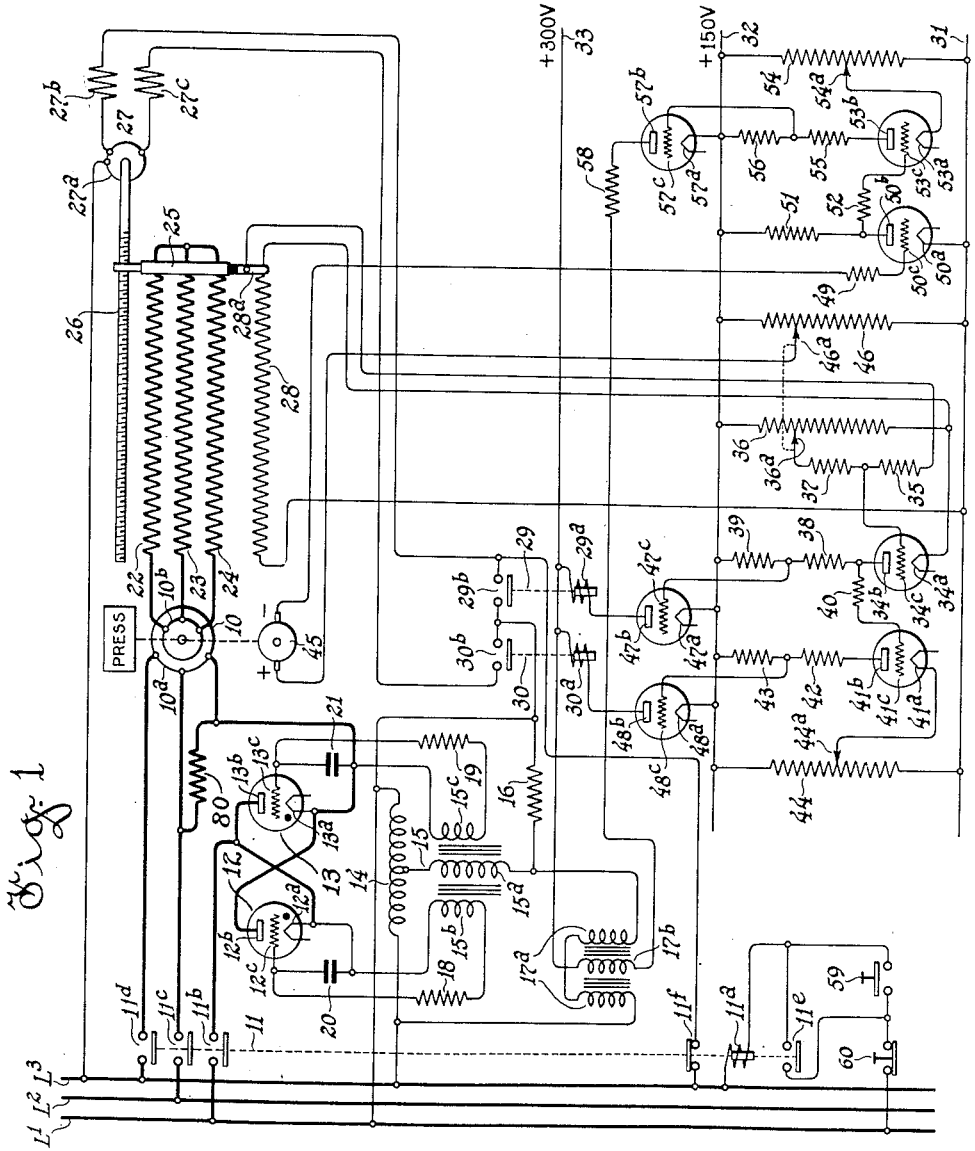
Fig. 1 is a circuit diagram of an unbalanced primary motor control system including the invention.

Referring first to Fig. 1, it will be seen that the circuit diagram there shown includes an induction motor 10 having a three-phase primary winding 10$^a$ and a three-phase secondary winding 10$^b$. The motor is shown as being coupled to a press or the like to drive the same at different speeds. However, it is to be understood that this is by way of illustration only. It is contemplated that the motor may be connected to any other load device presenting a variable load. The primary winding 10$^a$ is connectable to the bus bars L$^1$, L$^2$ and L$^3$ of a three-phase power source by means of an electromagnetic switch 11, with one terminal of the primary winding 10$^a$ being connectable to its respective bus bar through a pair of gaseous conduction tubes 12 and 13 connected in inverse parallel. The secondary winding 10$^b$ is connected to three star-connected resistors 22, 23 and 24, and the amount of resistance inserted in the winding may be varied by a cross-head 25 mounted on a threaded shaft 26 which in turn is operably connected for rotation by a reversible motor 27. The cross-head 25 is also provided with an insulated contact 28$^a$ which is adapted for sliding engagement with resistor 28.

The center tap of impedance 14, connected across lines L¹ and L³, is connected to one terminal of the primary winding 15ᵃ of a transformer 15. The other terminal of winding 15ᵃ is connected to one of the end terminals of impedance 14 through a resistor 16, and is also connected to the other end of impedance 14 through the windings 17ᵃ of a saturable reactor 17, having a control winding 17ᵇ. Transformer winding 15ᵇ is connected between cathode 12ᵃ and the control electrode 12ᶜ in series with a resistor 18, while the winding 15ᶜ is connected between the cathode 13ᵃ and control electrode 13ᶜ in series with a resistor 19. Fixed capacitors 20 and 21, respectively, are connected between the cathode 12ᵃ and control electrode 12ᶜ and between the cathode 13ᵃ and the control electrode 13ᶜ, respectively.

Further describing the control system for the tubes 12 and 13 and the motor 27, it will be seen that the energization of motor windings 27ᵇ and 27ᶜ is controlled by a pair of electromagnetic reversing switches 29 and 30, respectively. The system is also provided with a source of direct current energy by bus bars 31, 32 and 33, of which bus bar 31 is connected to one terminal of resistor 28, the second terminal of said resistor being connected to the cathode 34ᵃ of tube 34. The movable contact 28ᵃ is connected to the control electrode 34ᶜ through resistor 35. Connected between the cathode 34ᵃ and the bus bar 32 is a voltage-dividing resistor 36 which is the main speed setting resistor and which has a movable contact 36ᵃ connected in series with a resistor 37 to the electrode 34ᶜ. Anode 34ᵇ is connected in series with series connected resistors 38 and 39 to bus bar 32, and is also connected through a resistor 40 to the control electrode 41ᶜ of an electron tube 41. The anode 41ᵇ is connected through series connected resistors 42 and 43 to the bus bar 32. The cathode 41ᵃ is connected to the movable contact 44ᵃ of a voltage-dividing biasing resistor 44, the main terminals of which are connected across the bus bars 31 and 32. Coupled to the shaft of the motor 10 is a direct current tachometer generator 45 whose positive brush is connected to the movable contact 46ᵃ of an auxiliary speed setting potentiometer resistor 46. The movable contacts 36ᵃ and 46ᵃ are mechanically coupled with each other so that they may be moved simultaneously for selecting the operating speed of the motor 10. The common terminal of resistors 38 and 39 is connected to the control electrode 47ᶜ of an electron tube 47, of which the cathode 47ᵃ is connected to the bus bar 32 and the anode 47ᵇ is connected in series with the winding 29ᵃ to bus bar 33. The common terminal of the resistors 42 and 43 is connected to the control electrode 48ᶜ of an electron tube 48, which is also provided with a cathode 48ᵃ connected to the bus bar 32 and with an anode 48ᵇ connected in series with the winding 30ᵃ to bus bar 33. The negative terminal or brush of the tachometer 45 is connected through a resistor 49 to the control electrode 50ᶜ of tube 50 which has a cathode 50ᵃ connected to the bus bar 31 and an anode 50ᵇ connected through a resistor 51 to the bus bar 32. The anode 50ᵇ is also connected through a resistor 52 to the control electrode 53ᶜ of an electron tube 53 which is provided with a cathode 53ᵃ connected to the movable contact 54ᵃ of a voltage-dividing resistor 54. The tube 53 has also an anode 53ᵇ which is connected through the series connected resistors 55 and 56 to the bus bar 32. The common terminal of the resistors 55 and 56 is connected to the control electrode 57ᶜ of an electron tube 57, which is also provided with a cathode 57ᵃ connected to the bus bar 32 and with an anode 57ᵇ connected through a resistor 58 to one terminal of the winding 17ᵇ, the other terminal of which is connected to the bus bar 33.

For effecting control of the electromagnetic switch 11 a normally open pushbutton switch 59 and a normally closed pushbutton switch 60 are connected across lines L¹ and L³ in series with winding 11ᵃ. Connected in parallel with the pushbutton switch 59 are normally open contacts 11ᵉ.

Although I have described in detail the means for controlling the amount of resistance inserted in the secondary winding of the motor 10 and for controlling the amount of impedance inserted in the one leg of the primary winding 10ᵃ, it is to be understood that this is not by way of limitation. It is contemplated that the invention applies to all unbalanced primary control systems for polyphase induction motors in which a variable impedance of the space discharge type is inserted in one of the three lines to the primary terminals of the motor, which impedance is controlled automatically when a change in the load on the motor causes the motor speed to vary from that determined by the amount of resistance inserted in the secondary winding of the motor. For a more detailed description of the circuit diagram shown in Fig. 1, and also for a detailed description of its operation, reference may be had to the aforementioned Patent No. 2,460,037, the reference numerals of which patent correspond with those of the instant application, in respect of like parts. Generally speaking, however, it will be seen that the system described herein is one in which means are provided for first adjusting the speed of a polyphase induction motor by adjusting the impedance of the secondary circuit of the motor while balanced conditions exist in the primary circuit of the motor, and means for controlling the conductivity of the connection of one primary terminal of the motor to the polyphase power supply regulable by an electronic discharge in circuit with the one primary terminal, said last mentioned means being controllable in response to a departure in the motor speed from the preset speed.

It has been found that such systems as those above-described can be further improved in their speed controlling characteristics. Reference to Fig. 2 will disclose a diagram showing the speed-torque characteristics of a polyphase induction motor with a given value of secondary resistance, the balanced or three-phase curve being indicated at C and the single-phase curve being indicated by the dotted line D. Without the improvement, hereinafter to be described, the controllable region of the prior tube-controlled unbalanced primary control systems was that indicated by the shaded area between curves C and D. From the graph it will also be seen that when the value of the secondary resistance is low, an appreciable amount of positive single-phase torque exists which seriously restricts the useful control range. It is this positive single-phase torque which makes difficult the maintenance of good speed control under the certain conditions above described.

I have found, however, that if that primary terminal of the motor which is disconnected from its source when the tubes 12 and 13 are rendered non-conductive is connected through an impedance device to one of the other two phases of the polyphase power source when said tubes are non-conducting, the range of control of the subject control systems is very much extended. For example, it has been found that if a resistor 80 is connected between two of the three primary terminals 10ᵃ of induction motor 10, for a given value of secondary resistance a speed-torque curve such as curve E or curve F of Fig. 2 results when neither of tubes 12 and 13 is conducting, instead of the usual single-phase curve D. Whether the curve obtained is E or F depends upon to which other primary terminal the resistor 80 is connected and also upon which terminal is receiving its power through the tubes. In any case, however, a net reverse torque is introduced the magnitude of which torque is controllable by varying the amount of the impedance through which the two terminals are connected. Tests on a one horsepower wound rotor motor with a value of secondary resistance selected to provide stalled torque of about 250% indicate that a value of 120 ohms for the resistor 80 is sufficiently low to just nullify the positive single-phase torque and bring the motor to rest when it has practically no friction load except its own bearings and windage.

The existence of such curves as E or F, rather than D, means that the motor 10 may now be operated anywhere within the shaded area enclosed by the curves E or F and C, so that not only may a light load be kept under control by means of the thyratron tubes 12 and 13, but also braking action will be provided when said tubes are cut off and the motor will decelerate along curve E or F to a lower speed. It thus will be seen that this improvement substantially extends the utility of the prior tube-controlled unbalanced primary control systems, a particular advantage of the improvement being that the functioning of the control systems remains the same with the exception that an additional load is placed on the tubes 12 and 13 because of the circuit through resistor 80 and also, in compensation for the slight negative torque induced in the motor 10 every half cycle when the voltage in said tubes goes through zero.

An alternative method of obtaining the improved speed-torque characteristics is illustrated in Fig. 3. Instead of using the resistor 80, an autotransformer 81 may be connected between the supply line in which the tubes 12 and 13 are connected and either of the remaining two supply lines. The autotransformer has an overhanging winding 81ᵃ which is connected through a resistor 82 to the motor primary terminal which is fed through the tubes 12 and 13, the purpose of the resistor 82 being to protect against short-circuiting the winding 81ᵃ when either of tubes 12 and 13 is conducting. Although this circuit is similar in its simplicity to that shown in Fig. 1, it too has the disadvantage of useless power dissipation in resistor 82 all the time the motor 10 is running with the tubes 12 and 13 phased on.

Since the only time the resistor 80 or the autotransformer 81 and resistor 82 are needed is when the tubes 12 and 13 are phased off for the purpose of decelerating the motor or maintaining speed at a very light load, a method whereby the resistor would be connected in the circuit only when needed would be desirable. One such method, for purposes of illustration, is shown in Fig. 4 wherein the winding 83ᵃ of an electromagnetic switch 83 is connected between the cathode 13ᵃ and the anode 13ᵇ of electron tube 13 so that the switch is energized when the tube 13 is phased almost off, but drops out when the tube is phased on because the effective voltage across the tube then becomes insufficient to keep the switch energized. The normally open contacts 83ᵇ of the switch 83 are connected in series with the resistor 84 between two of the primary terminals of the motor 10 and operate to connect the resistor 84 into and out of circuit as required. It is assumed that there is sufficient delay in the switch response that operation occurs only when the tubes are practically non-conducting for a period of at least several cycles of the supply frequency.

I claim:

1. In a control system for an induction motor, in combination, a source of polyphase current, a motor having a polyphase primary winding including a plurality of terminals for connecting it to said source, regulable space discharge means interposed between said source and one of said primary terminals for controlling the connection of said single terminal to said source to effect a condition of unbalance in said primary winding, and an impedance device having a fixed impedance value directly correlated to the power rating of said motor and connected between said single terminal and one of the other of said terminals, to be rendered effective upon non-conduction of said space discharge means to vary further the condition of unbalance in said winding.

2. In a control system for an induction motor subject to intermittent operation at light load, in combination, a source of polyphase current, a polyphase motor having its primary winding supplied from said source, space discharge means interposed between said source and one of the primary terminals of said motor, control means for varying the period of conduction of said space discharge means in accordance with the departure of the motor speed from a preset speed, and impedance means through which said one of the primary terminals is connected to one of the other primary terminals of said motor, said impedance means having a fixed impedance value directly correlated to the power rating of said motor that upon sudden occurrence of a light load which tends to effect acceleration of said motor and consequent non-conduction of said space discharge means a net reverse torque is exerted on said motor which assures that said motor speed will return to said preset speed.

3. In combination, a polyphase alternating current motor subjected to light loads which tend to effect acceleration of said motor, a power supply circuit therefor, space discharge means interposed between said supply and one of the primary terminals of said motor for effecting voltage unbalance of the motor primary and consequent retarding of said motor, an impedance device having a fixed impedance value directly correlated to the power rating of said motor for the purpose hereinafter set forth, and means to connect said impedance device between said one of the primary terminals and one of the other primary terminals to provide when said space discharge means is rendered substantially non-conductive a substantial increase in retardation of said motor.

4. In a control system for a polyphase induction motor subjected to light loads which tend to effect an increase in the speed of said motor and wherein the speed of said motor is selected by adjusting the impedance in the secondary of said motor while maintaining substantially balanced conditions in the motor primary and the conduction of space discharge means interposed between one of the motor primary terminals and its power source is varied to retard said motor when it tends to depart from the preset speed upon occurrence of light load condition, an impedance device having a fixed impedance value directly correlated to the power rating of said motor for the purpose hereinafter set forth, and means for connecting said impedance device between one of the motor primary terminals and one of the other primary terminals when said space discharge means is substantially non-conducting so that the retarding effect of said control system on said motor is substantially increased.

5. In combination with an unbalanced primary control system comprising a polyphase induction motor, a power supply circuit therefor and space discharge means interposed between said supply and one of the primary terminals of said motor for effecting voltage unbalance of the motor primary, an impedance device having a fixed impedance value directly correlated to the power rating of said motor for the purpose hereinafter set forth, and means connecting said impedance device between said one of the primary terminals and one of the other primary terminals whereby the range of control of said control system is substantially increased.

6. The combination according to claim 5 wherein the impedance device is a fixed resistor.

7. The combination according to claim 5 wherein the impedance device comprises an autotransformer connected between two phases of the power supply circuit.

8. In combination with a polyphase induction motor and a source of polyphase current, said motor having a plurality of terminals for connection to said source; an impedance device which connected across two of said primary terminals effects upon interruption of current supply to one of said terminals abrupt torque reversal; and regulable space discharge means interposed between one of said two motor terminals and said source for unbalancing the motor primary in a stepless manner through a range widened by the abrupt torque reversal effected by said impedance device upon cessation of discharge by said space discharge means, said space discharge means and said impedance device being connected for and only for such actions.

9. A motor control system according to claim 8 wherein the impedance device has a fixed impedance value directly correlated to the power rating of said motor.

10. A motor control system according to claim 9 wherein the impedance device is a fixed resistor.

11. A motor control system according to claim 9 wherein the impedance device is an autotransformer connected between two phases of the power supply circuit.

WILLIAM H. ELLIOT.

References Cited in the file of this patent

UNITED STATES PATENTS

| Number | Name | Date |
|---|---|---|
| 2,420,192 | Rathbun | May 6, 1947 |
| 2,448,256 | Elliot | Aug. 31, 1948 |
| 2,460,037 | Seeger | Jan. 25, 1949 |
| 2,460,234 | Myles | Jan. 25, 1949 |
| 2,512,000 | Seeger et al. | June 20, 1950 |
| 2,519,196 | Pell | Aug. 15, 1950 |
| 2,583,731 | Elliot | Jan. 29, 1952 |
| 2,597,141 | Wickerham | May 20, 1952 |